G. S. KNOX.
COTTON HARVESTER.
APPLICATION FILED SEPT. 28, 1917.
1,395,644.
Patented Nov. 1, 1921.
4 SHEETS—SHEET 4.
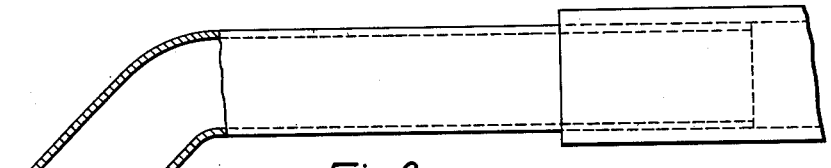
Fig.8.
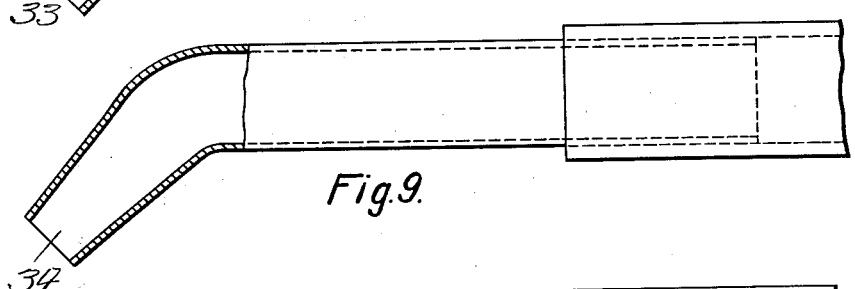
Fig.9.
Fig.10.
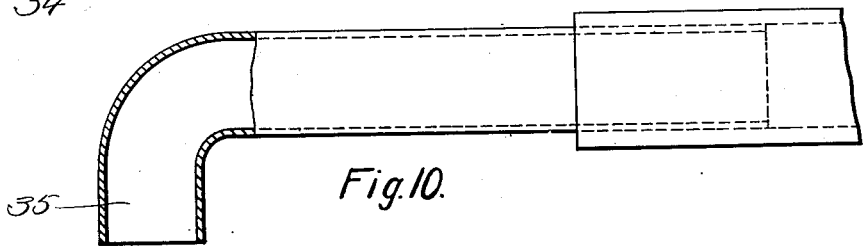
Fig.11.
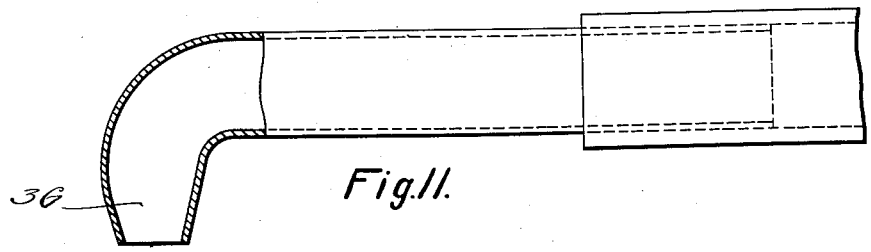
Fig.12.
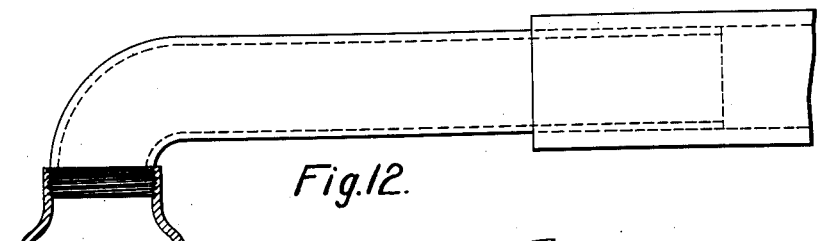
WITNESSES: Fig.13.
R. J. Fitzgerald.
Olen E. Bee.
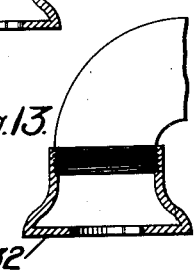
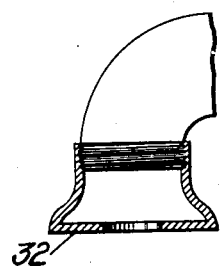
Fig.14. INVENTOR
George S. Knox.
BY J. R. Langley
ATTORNEY

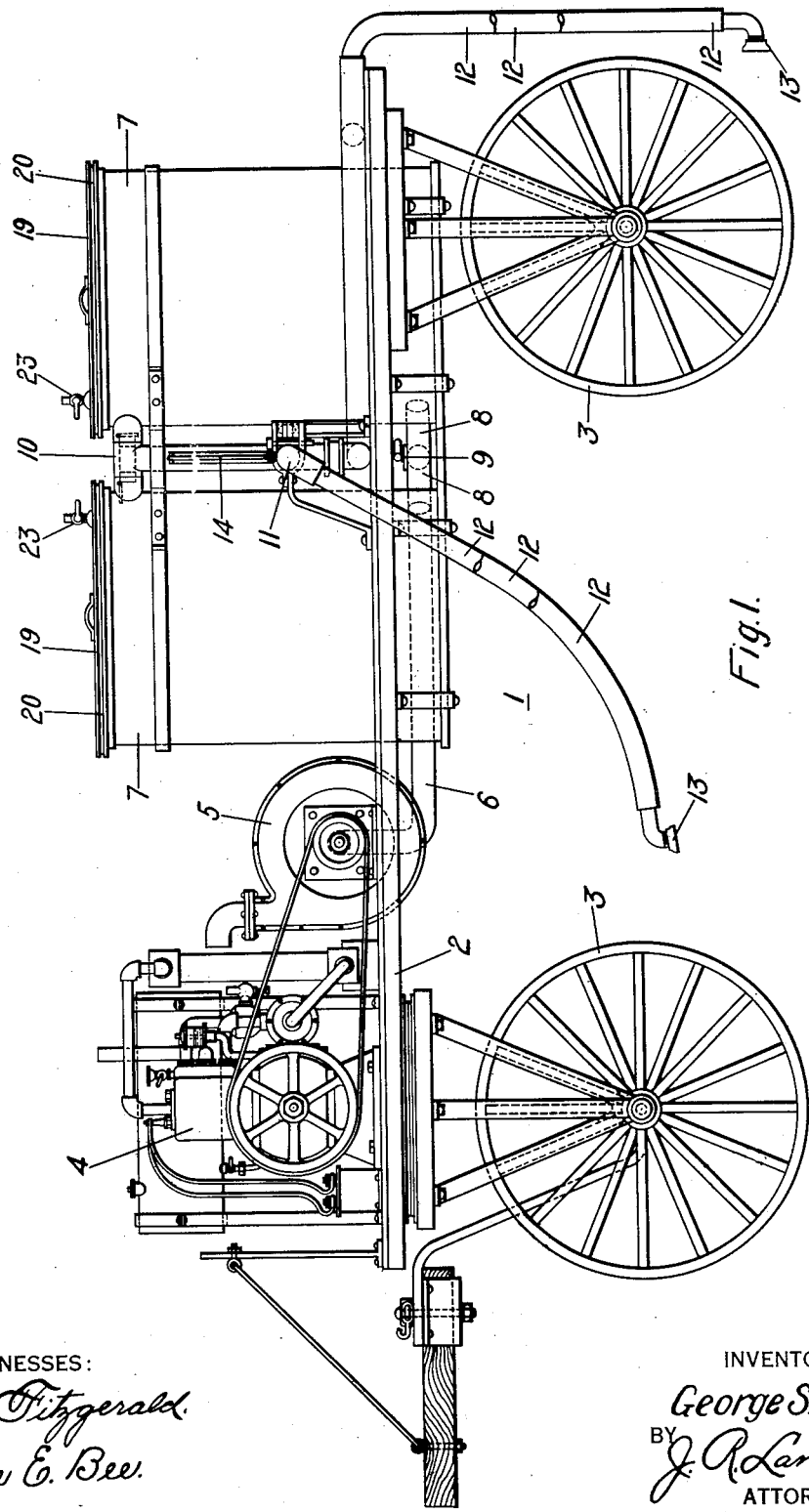

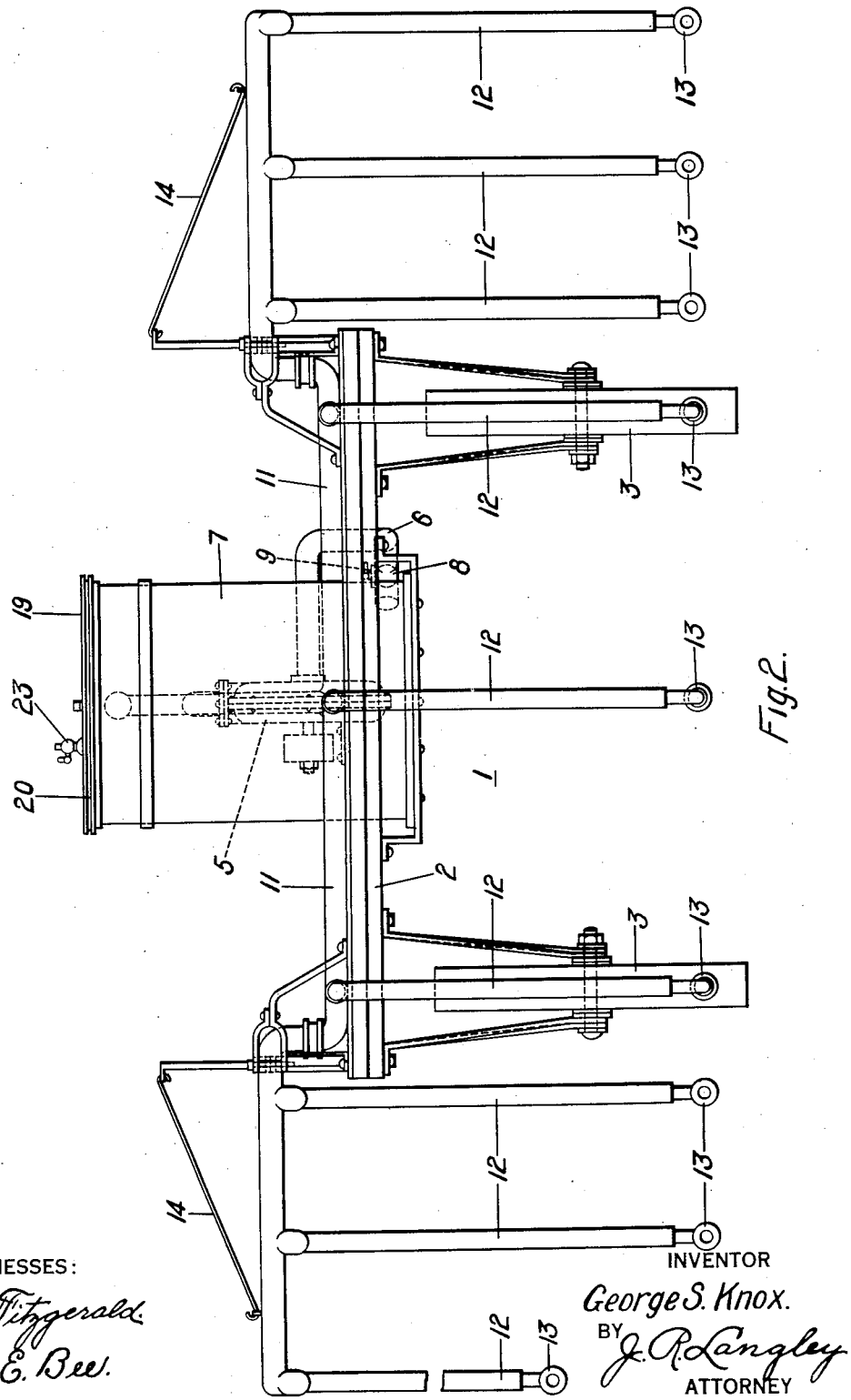

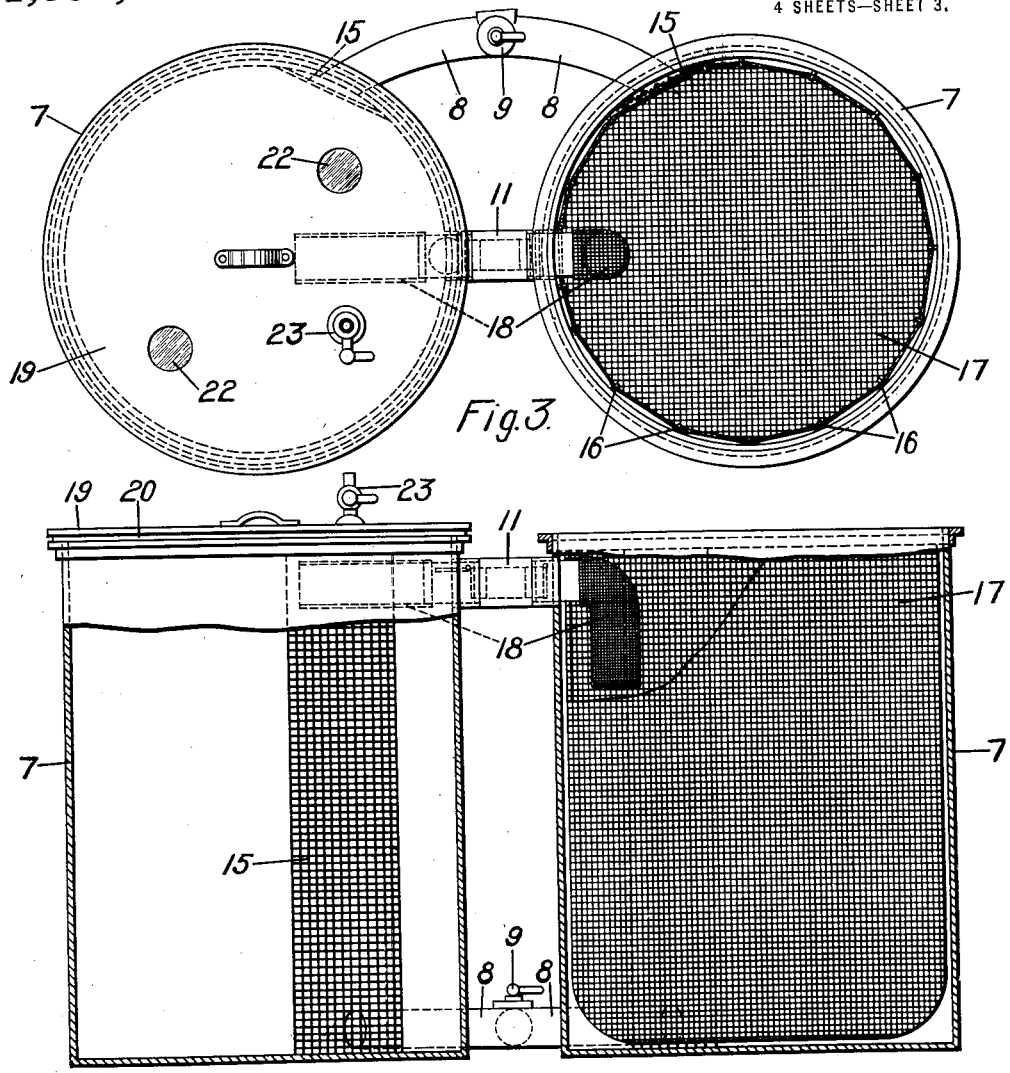
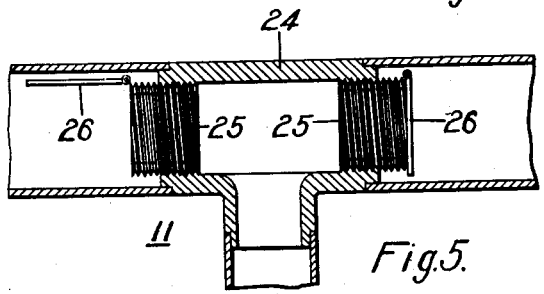
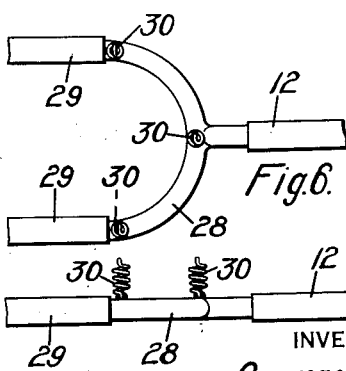

UNITED STATES PATENT OFFICE.

GEORGE S. KNOX, OF WILKINSBURG, PENNSYLVANIA.

COTTON-HARVESTER.

1,395,644.

Specification of Letters Patent.  Patented Nov. 1, 1921.

Application filed September 28, 1917. Serial No. 193,680.

*To all whom it may concern:*

Be it known that I, GEORGE S. KNOX, a citizen of the United States, and a resident of Wilkinsburg, in the county of Allegheny and State of Pennsylvania, have invented a new and useful Improvement in Cotton-Harvesters, of which the following is a specification.

My invention relates to cotton harvesters and particularly to such harvesters as embody pneumatic apparatus for removing cotton from the bolls of the plants and conveying it to suitable receptacles.

My invention has for one of its objects to provide an arrangement whereby the cotton that has been collected may be removed from its container without affecting the normal operation of the machine.

A second object of my invention is to provide a valve mechanism for automatically controlling the connections of the collecting devices to the containers in accordance with the relative values of fluid pressure in the latter.

Another object of my invention is to provide a method of operation whereby the current of air applied to the ripe bolls of the plants has high velocity and is of relatively small volume whereby its effect is localized in such manner that the cotton only is affected and bolls and leaves are not collected with the cotton.

A further object of my invention is to provide collecting devices of novel and improved construction whereby entrance of foreign material is prevented and whereby adjustment may be made in accordance with operating conditions and the nature of the material being harvested.

Cotton harvesters of the pneumatic type have been proposed, heretofore, but the numerous devices of the prior art have proven impractical and have been substantially abandoned because they could not be made to collect cotton without, at the same time, collecting leaves, sticks and bolls in such quantities as to render the slower but more accurate, method of hand picking much more desirable.

I have found that these results were caused by the universal use of pneumatic apparatus which produced a current of air of large volume at a low speed. The space affected by the current of air entering the nozzle was very large and the forces exerted upon adjacent objects within this space did not vary materially. Consequently, the cotton could not be removed from the plants without collecting a large quantity of foreign matter consisting of loose leaves, bolls, etc., that were in the vicinity of the cotton.

I have discovered that, if a current of air of high velocity and small volume is employed, cotton may be successfully harvested with a percentage of foreign matter so low that it compares most favorably with that gathered by hand. The effect of a nozzle employing a current of air of the character set forth above is extremely local in in its application. It it possible, therefore, to exert a strong force to withdraw the cotton from a boll without disturbing the boll or such leaves as may be near the boll being picked.

A harvester constructed in accordance with my invention comprises a plurality of tanks or containers into which the cotton is drawn by vacuum apparatus. A high speed air pump may be connected to the one or the other of the tanks by suitable valve mechanism. The pipes for conducting the cotton to the tanks are connected to the tank to which suction is applied by an automatic valve mechanism which operates in accordance with the relative pressures in the tanks. The cotton may thus be removed from either of the containers without, in any way, interfering with the normal operation of the harvester.

The details of my invention will be described in connection with the accompanying drawings in which Figure 1 is a side view in elevation of a cotton harvester constructed in accordance with my invention. Fig. 2 is a rear view in elevation of the harvester shown in Fig. 1. Fig. 3 is a top view in plan of the tanks and associated parts, the cover of one of the tanks being removed. Fig. 4 is a side view in section of the tanks. Fig. 5 is a view in section of the automatic valve mechanism. Figs. 6 and 7 are respectively top and side views of an arrangement for providing branch pipes and means for carrying the same. Figs. 8, 9, 10, 11, 12, 13 and 14 are views, partially in elevation and partially in section, of picker nozzles.

Referring particularly to Figs. 1 and 2, a cotton harvester comprises a vehicle 1, or truck, the body 2 of which is of such height as to be well above the tops of the cotton plants when the machine is in the field. The wheels 3 are adjustably secured to the body 2 in any suitable manner in order to conform to the distance between rows. A gas engine 4, which may be of any suitable type, drives a centrifugal air pump or fan 5 at a very high speed. The inlet pipe 6 of the pump 5 is connected to a pair of cylindrical tanks 7 by means of a pair of branch pipes 8 and a three-way valve 9.

The tanks 7 are connected, by means of an automatic valve mechanism 10, to a pneumatic trunk 11, the outer sections of which are pivotally connected to the central section. The trunk 11 is provided with a number of flexible branch pipes 12 having picker nozzles 13. The number of branch pipes may be any desired, nine being shown by way of example. The machine, as illustrated, is arranged to collect cotton from nine rows simultaneously. The outer sections of the pneumatic trunk 11, which are supported by rods 14, are of such height as to be above the heads of the operators during the operation of the machine. When the machine is not operating, the end sections may be folded back over the body of the truck.

Reference may now be had to Figs. 3 and 4, in which the details of the tanks 7 are illustrated. It will be noted that the air is withdrawn from the bottoms of the tanks and the cotton enters at the tops of the tanks. This arrangement causes the cotton to be drawn toward the bottoms of the tanks to form a compact mass. Larger quantities may thus be collected before it is necessary to empty the tanks. Each of the tanks is provided with a suitable screen 15 of wire netting or perforated sheet material which covers the end of the corresponding branch pipe 8 and extends to the top of the tank. This arrangement insures the passage of air at all times, regardless of the degree to which the tank may be filled with cotton. It will, of course, be understood that the perforations may be made in the side walls of the tanks and may extend only a portion of the lengths of the tanks, if so desired.

Each of the tanks 7 is provided with a row of hooks 16 from which is suspended a bag 17 into which the cotton is collected and by means of which the cotton may be readily removed and transported upon the truck to the end of the field. The cotton enters the tank through the automatic valve mechanism 11 and a flexible sleeve 18 which assumes a horizontal position to direct the cotton to the center of the tank, as clearly shown in the view of the tank on the left, Fig. 4. When the tank is not in operation, the sleeve falls to the position shown in the view of the tank on the right, Figs. 3 and 4. The sleeves 18 are made of flexible material in order that they do not interfere with the removal of the bags 17 when the latter are filled.

Each of the tanks 7 is further provided with a removable cover 19 having a gasket 20 of rubber, or other suitable material, for insuring a relatively tight fit. Each tank cover is provided with a plurality of glass covered openings 22, by means of which the operator may, at any time, ascertain the amount of cotton in the tank without removing the cover. Vacuum release cocks 23 insure the easy opening of either of the tanks after the air has been transferred to the other tank.

Referring now to Fig. 5, in which the automatic valve mechanism is illustrated in enlarged detail, the trunk 11 is connected to a member 24 of T-shape, the ends of which are connected to the respective tanks 7. Each end of the member 24 is screw-threaded to receive a valve comprising a tubular member 25 and a disk 26 which is pivotally mounted at its top portion and normally closes the opening in member 25. When air is withdrawn from one of the tanks, the corresponding valve is opened and the incoming cotton is directed automatically to the proper tank. The other valve is held tightly closed because of the difference in pressures in the respective tanks.

Figs. 6 and 7 illustrate an arrangement whereby each of the branch pipes 12 may be divided to provide picker nozzles for both hands of the operators. Each pipe 12, which is at the rear of the operator, is connected to a pipe 28 of substantially U-shape which is arranged to pass around the body of the operator.

Each arm of the pipe 28, is in turn provided with a flexible hose or pipe 29 and a picker nozzle 13, the latter not being shown in these views. The whole device may be suspended from the shoulders of the operator by means of straps or other suitable devices, not shown, which are connected to springs 30. The arms of the operator are thus left free to operate the picker nozzles.

Figs. 8 to 14 represent picker nozzles of various types that may be employed in accordance with the nature of the material to be collected and other operating conditions. Figs. 8 and 9 show nozzles 33 and 34 having respectively full and restricted openings. When the latter type of nozzle is employed, the velocity of the current of air is materially increased at the nozzle end, as will be readily understood.

Figs. 10 and 11 illustrate nozzles 35 and 36 similar to those of Figs. 8 and 9 respectively except that they have a different angle with the pipe of which they are a part. It will be understood that the nozzles may be constructed at any desired angle.

Figs. 12, 13 and 14 show nozzles that are detachable in order that the degree of opening may be arranged as desired. The velocity of the air at the point where the cotton is lifted from the boll is thus adjusted.

Each of the nozzles is provided with a flange portion 32, which prevents the entrance of foreign matter such as bolls, sticks and leaves.

In the operation of the machine, the gas engine 4 drives the fan 5 at such speed that air is drawn through the nozzles 13 at high velocity. The air passes through the pipes 12, trunk 11, automatic valve 10, tank 7, branch pipe 8, valve 9, pipe 6 and fan 5 to the atmosphere.

When the picker nozzles are properly placed in close proximity to the cotton in the bolls, the cotton is quickly drawn through the nozzles into the pipes 12. The rate of travel of the cotton depends upon the rate of the current of air at that place. The rate of travel is uniform through openings of the same cross section, and greater through restricted openings such as those in certain of the nozzles previously described.

If the operator is reasonably careful, few or no leaves and bolls are drawn into the nozzles. This most desirable condition is brought about by the use of air at high velocity and in relatively small quantity. The result is to localize the effect of the moving air and to cause great differences in the pulls exerted within small distances from the opening of the nozzle. It is possible, therefore, to so manipulate the nozzles as to apply a relatively strong force to the cotton while there is a very small force applied to the bolls. This effect may be increased by reducing the size of openings of the nozzles.

The cotton is retained in the bag 17 with which the tank is provided. When the operator observes that the tank is filled to the desired degree, the valve 9 is operated to connect the fan to the other tank. The automatic valves immediately connect the trunk 10 to the other tank 7 and the picking operation continues without interruption. The release cock 23 of the full tank is then opened and the cover 19 is removed. The bag 17 is then closed by a drawstring or other suitable means and is removed from the tank. It may then be placed on the truck and carried to the end of the field. Another bag is placed in the tank just emptied and the operation continues as described above.

I claim as my invention:

1. In a collecting machine, the combination with a pair of tanks, an air impelling device and a collecting pipe, of valve mechanisms for controlling the operative connection of said device and of said pipe to said tanks, and means for controlling said valve mechanisms.

2. In a collecting machine, the combination with a rotatable fan, a pair of tanks and a collecting pipe, of valve mechanism for controlling the operative connection of said fan to the one or the other of said tanks and a second valve mechanism for operatively connecting said pipe to one or the other of said tanks.

3. In a cotton harvester, the combination with a pair of tanks, means for actuating a current of air through said tanks and a collecting pipe, of means for selectively controlling the operative connection of said actuating means to the one or the other of said tanks, and for controlling the operative connection of said pipe to the one or the other of said tanks in accordance with the operative connection of said actuating means.

4. In a cotton harvester, the combination with a pair of tanks and means for actuating a current of air through said tanks, of means for selectively controlling the operative connection of said actuating means to the one or the other of said tanks, a pipe, and valve mechanism for arranging the operative connection of said pipe to the one of said tanks to which said actuating means is connected.

5. In a cotton harvester, the combination with a pair of tanks, a fan operatively connected thereto and a collecting pipe, of manually operable means for controlling the operative connection of said fan to the one or the other of said tanks and valve mechanism for operatively connecting said collecting pipe to the tank to which said fan is connected.

6. In a cotton harvester, the combination with a pair of tanks and means for actuating a current of air through said tanks, of means for selectively controlling the operative connection of said actuating means to the one or the other of said tanks.

7. In a cotton harvester, the combination with a pair of tanks, a fan operatively connected thereto and a collecting pipe, of manually operable means for controlling the operative connection of said fan to the one or the other of said tanks.

8. In a cotton harvester, the combination with a pair of tanks, means for actuating a current of air through said tanks and a collecting pipe, of means for selectively controlling the operative connection of said actuating means to the one or the other of said tanks, and means for automatically controlling the operative connection of said pipe to the one or the other of said tanks in accordance with the operative connection of said actuating means.

9. In a cotton harvester, the combination with a pair of tanks and means for actuating a current of air through said tanks, of means for selectively controlling the operative connection of said actuating means to the one or the other of said tanks, a pipe, and automatic valve mechanism for arranging the operative connection of said pipe to the one of said tanks to which said actuating means is connected.

10. In a cotton harvester, the combination with a pair of tanks, a fan operatively connected thereto and a collecting pipe, of manually operable means for controlling the operative connection of said fan to the one or the other of said tanks and valve mechanism for automatically operatively connecting said collecting pipe to the tank to which said fan is connected.

In testimony whereof, I have hereunto subscribed my name this 6th day of Sept., 1917.

GEORGE S. KNOX.